United States Patent
Feng et al.

(10) Patent No.: US 12,228,919 B2
(45) Date of Patent: Feb. 18, 2025

(54) INFORMATION TRANSLATION DEVICE, METHOD, SYSTEM AND COMPUTER READABLE RECORDING MEDIUM BASED ON MODBUS

(71) Applicant: Industrial Technology Research Institute, Hsinchu (TW)

(72) Inventors: Yang-Ching Feng, Miaoli County (TW); Chiao-Ying Ku, Hsinchu County (TW); Tien-Hua Chiang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 700 days.

(21) Appl. No.: 17/123,151

(22) Filed: Dec. 16, 2020

(65) Prior Publication Data

US 2022/0147031 A1     May 12, 2022

(30) Foreign Application Priority Data

Nov. 9, 2020 (TW) ................................ 109138971

(51) Int. Cl.
G05B 23/02    (2006.01)
G06F 12/1009  (2016.01)
G06F 12/1027  (2016.01)

(52) U.S. Cl.
CPC ..... G05B 23/0213 (2013.01); G05B 23/0297 (2013.01); G06F 12/1009 (2013.01); G06F 12/1027 (2013.01)

(58) Field of Classification Search
CPC ............ G05B 23/0213; G05B 23/0297; G05B 2219/31118; G05B 19/4186;
(Continued)

(56) References Cited

U.S. PATENT DOCUMENTS 5,862,391 A * 1/1999 Salas ................... G01D 4/002
                                              713/300
6,282,605 B1 * 8/2001 Moore .................. G06F 16/10
                                              707/999.005
(Continued)

FOREIGN PATENT DOCUMENTS

CN    101208674    6/2008
CN    104932364    3/2018
(Continued)

OTHER PUBLICATIONS

Bill Drury, "The Control Techniques, Drives and Controls Handbook," The Institution of Engineering and Technology, 2009, pp. 1-765.
(Continued)

*Primary Examiner* — Tung S Lau
(74) *Attorney, Agent, or Firm* — JCIPRNET

(57) ABSTRACT

An information translation device, information translation method, and an information translation system based on Modbus are provided. The client module of the information translation device receives an information model file including identity information, receives a sensor signal corresponding to first identity information and Modbus data including memory addresses of Modbus protocol, determines a first memory address corresponding to the sensor signal according to sensed values of the sensor signal and values corresponding to each of the memory addresses and builds a memory address mapping table including the first memory address and the first identity information, and receives a first value of the first memory address and searches the first identity information corresponding to the first memory address according to the memory address mapping table. The server module of the information trans-
(Continued)

lation device receives the first value and the first identity information and transmits to an OPC UA device.

13 Claims, 2 Drawing Sheets

(58) Field of Classification Search
CPC ............ G06F 12/1009; G06F 12/1027; G06F 2212/163; G06F 12/0292; G06F 2212/1024; G06F 12/023; Y02P 90/02; H04L 12/40006; H04L 2012/40228
See application file for complete search history.

(56) References Cited

U.S. PATENT DOCUMENTS

| | | | | |
|---|---|---|---|---|
| 7,647,329 | B1* | 1/2010 | Fischman | G06F 3/067 707/999.1 |
| 8,549,065 | B2 | 10/2013 | Mahnke | |
| 9,854,027 | B2 | 12/2017 | Volkmann et al. | |
| 9,921,970 | B2* | 3/2018 | Borikar | G06F 3/067 |
| 10,241,951 | B1* | 3/2019 | Ayoub | G06F 3/0604 |
| 10,317,858 | B2 | 6/2019 | Ray et al. | |
| 10,534,719 | B2* | 1/2020 | Beard | G06F 12/109 |
| 11,321,264 | B2* | 5/2022 | Harriman | G06F 13/4068 |
| 11,593,291 | B2* | 2/2023 | Pilmore | G06F 13/4022 |
| 11,934,319 | B2* | 3/2024 | Bradshaw | G06F 9/5016 |
| 2004/0105112 | A1* | 6/2004 | Ishihara | G06F 3/1204 358/1.15 |
| 2009/0119437 | A1* | 5/2009 | Hilscher | H04L 12/4135 710/305 |
| 2013/0063449 | A1 | 3/2013 | Leitner et al. | |
| 2014/0040431 | A1 | 2/2014 | Rao et al. | |
| 2016/0026173 | A1 | 1/2016 | Willis et al. | |
| 2016/0127514 | A1 | 5/2016 | Maksumov et al. | |
| 2017/0126738 | A1* | 5/2017 | Wilkerson | G06F 21/52 |
| 2018/0321662 | A1 | 11/2018 | Nixon et al. | |
| 2020/0014207 | A1 | 1/2020 | Bickel et al. | |

FOREIGN PATENT DOCUMENTS

| | | |
|---|---|---|
| CN | 108293017 | 7/2018 |
| CN | 109257208 | 1/2019 |
| CN | 110049014 | 7/2019 |
| CN | 110708240 | 1/2020 |
| CN | 111556074 | 8/2020 |
| FR | 2930394 | 10/2009 |
| IN | 110582732 | 12/2019 |
| KR | 101970715 | 4/2019 |
| TW | 201137239 | 11/2011 |
| TW | 201947911 | 12/2019 |

OTHER PUBLICATIONS

EUROMAP, "OPC UA interfaces for plastics and rubber machinery—General Type definitions," EUROMAP 83, OPC 40083, Release 1.01. Jan. 28, 2019, pp. 1-77.

Udo Enste et al., "OPC Unified Architecture," at—Automatisierungstechnik, vol. 59, Issue 7, Jun. 29, 2011, pp. 397-404.

OPC Foundation, "OPC Unified Architecture. Interoperability for Industrie 4.0 and the Internet of Things. IoT 4.0. Industrie M2M," Version 44, Jun. 2020, pp. 1-56.

Zijue Weng et al., "Designing Modbus-based OPC UA Server," Computer Applications and Software, vol. 31, Issue 2, Feb. 2014, pp. 1-5.

"Office Action of Taiwan Counterpart Application", issued on Jun. 17, 2022, p. 1-p. 7.

"Office Action of China Counterpart Application", issued on Jan. 23, 2024, p. 1-p. 13.

* cited by examiner

INFORMATION TRANSLATION DEVICE, METHOD, SYSTEM AND COMPUTER READABLE RECORDING MEDIUM BASED ON MODBUS

CROSS-REFERENCE TO RELATED APPLICATION

This application claims the priority benefit of Taiwan application serial no. 109138971, filed on Nov. 9, 2020. The entirety of the above-mentioned patent application is hereby incorporated by reference herein and made a part of this specification.

BACKGROUND

Technical Field

The disclosure relates to an information translation device, an information translation method, and an information translation system based on Modbus.

Description of Related Art

In Industry 4.0, the open platform communication unified architecture (OPC UA) is a necessary international standard. Many outdated devices that do not support the OPC UA face the issue of upgrading. For example, for Modbus devices that only support the Modbus protocol, the Modbus protocol is restricted to transmit data among Modbus devices. Therefore, for Modbus devices having only Modbus communication capabilities, it takes lots of time to write drivers to convert the Modbus communication capabilities into a suitable one for an open platform communication unified architecture (OPC UA) protocol.

SUMMARY

The disclosure provides an information translation device, an information translation method, an information translation system, and a non-volatile computer readable recording medium based on Modbus to translate and transmit data from the Modbus device to an open platform communication unified architecture (OPC UA) device.

The information translation device based on Modbus in the disclosure includes a client module and a server module. The client module receives an information model file. The information model file includes identity information. The client module receives a sensor signal corresponding to first identity information and a Modbus data. The Modbus data includes multiple memory addresses of the Modbus protocol. The client module determines a first memory address of the multiple memory addresses corresponding to the sensor signal according the multiple sensed values of the sensor signal and the multiple values corresponding to each of the memory addresses and builds a memory address mapping table including the first memory address and the first identity information. The client module receives the first value of the first memory address and searches the first identity information corresponding to the first memory address according to the memory address mapping table. The server module is coupled to the client module. The server module receives the first value and the first identity information and transmits the first value and the first identity information to an open platform communication unified architecture (OPC UA) device.

The information translation method based on Modbus in the disclosure includes: receiving an information model file by a client module, in which the information model file includes identity information; receiving the sensor signal corresponding to a first identity information and the Modbus data by the client module, in which the Modbus data includes multiple memory addresses of the Modbus protocol; determining the first memory address of the multiple memory addresses corresponding to the sensor signal according to the multiple sensed values of the sensed signal and the multiple values corresponding to each of the memory addresses and building a memory address mapping table to include the first memory address and the first identity information by the client module; receiving the first value of the first memory address and searching the first identity information corresponding to the first memory address according to the memory address mapping table by the client module; and receiving the first value and the first identity information and transmitting the first value and the first identity information to an open platform communication unified architecture (OPC UA) device by a server module.

The information translation system based on Modbus in the disclosure includes a Modbus device, an open platform communication unified architecture (OPC UA) device, and an information translation device based on Modbus. The Modbus device supports the Modbus protocol. The open platform communication unified architecture device supports the open platform communication unified architecture communication protocol. The information translation device based on Modbus receives a Modbus data by the Modbus device through the Modbus protocol and transmits the translated Modbus data to the open platform communication unified architecture device through the open platform communication unified architecture communication protocol. The information translation device includes a client module and a server module. The client module receives an information model file, and the information model file includes identity information. The client module receives the sensor signal corresponding to the first identity information and the Modbus data. The Modbus data includes multiple memory addresses of the Modbus protocol. The client module determines the first memory address of the plurality of memory addresses corresponding to the sensor signal according to the multiple sensed values of the sensor signal and the multiple values corresponding to each of the memory addresses, and builds a memory address mapping table including the first memory address and the first identity information. The client module receives the first value of the first memory address and searches the first identity information corresponding to the first memory address according to the memory address mapping table. The server module is coupled to the client module. The server module receives the first value and the first identity information and transmits the first value and the first identity information to the open platform communication unified architecture device.

The non-volatile computer readable recording medium in the disclosure is adapted to receive a Modbus data through the Modbus protocol and transmit the translated Modbus data to the open platform communication unified architecture device through an open platform communication unified architecture (OPC UA) protocol. The non-volatile computer readable recording medium stores a program code, and through a processor the program code performs the followings: receiving an information model file by a client module, in which the information model file includes identity information; receiving a sensor signal corresponding to first identity information and the Modbus data by the client module, in which the Modbus data includes multiple memory addresses of the Modbus protocol; determining a first memory address of the multiple memory addresses corresponding to the sensor signal by the client module according to the multiple sensed values of the sensor signal and the multiple values corresponding to each of the memory addresses, and building a memory address mapping table to include the first memory address and the first identity information; receiving a first value of the first memory address by the client module and searching the first identity information corresponding to the first memory address according to the memory address mapping table; and receiving the first value and the first identity information and transmitting the first value and the first identity information to an open platform communication unified architecture device by a server module.

Based on the above, in the disclosure, the information translation device, the information translation method, the information translation system, and the non-volatile computer readable recording medium based on Modbus are capable of receiving a sensor signal corresponding to the first identity information and determining the first memory address of the Modbus data corresponding to the sensor signal. Accordingly, the first identity information and the value of the first memory address are transmitted to an open platform communication unified architecture (OPC UA) device.

In order to make the aforementioned features of the disclosure comprehensible, embodiments accompanied with drawings are described in detail below.

DESCRIPTION OF THE EMBODIMENTS

Figure 1:
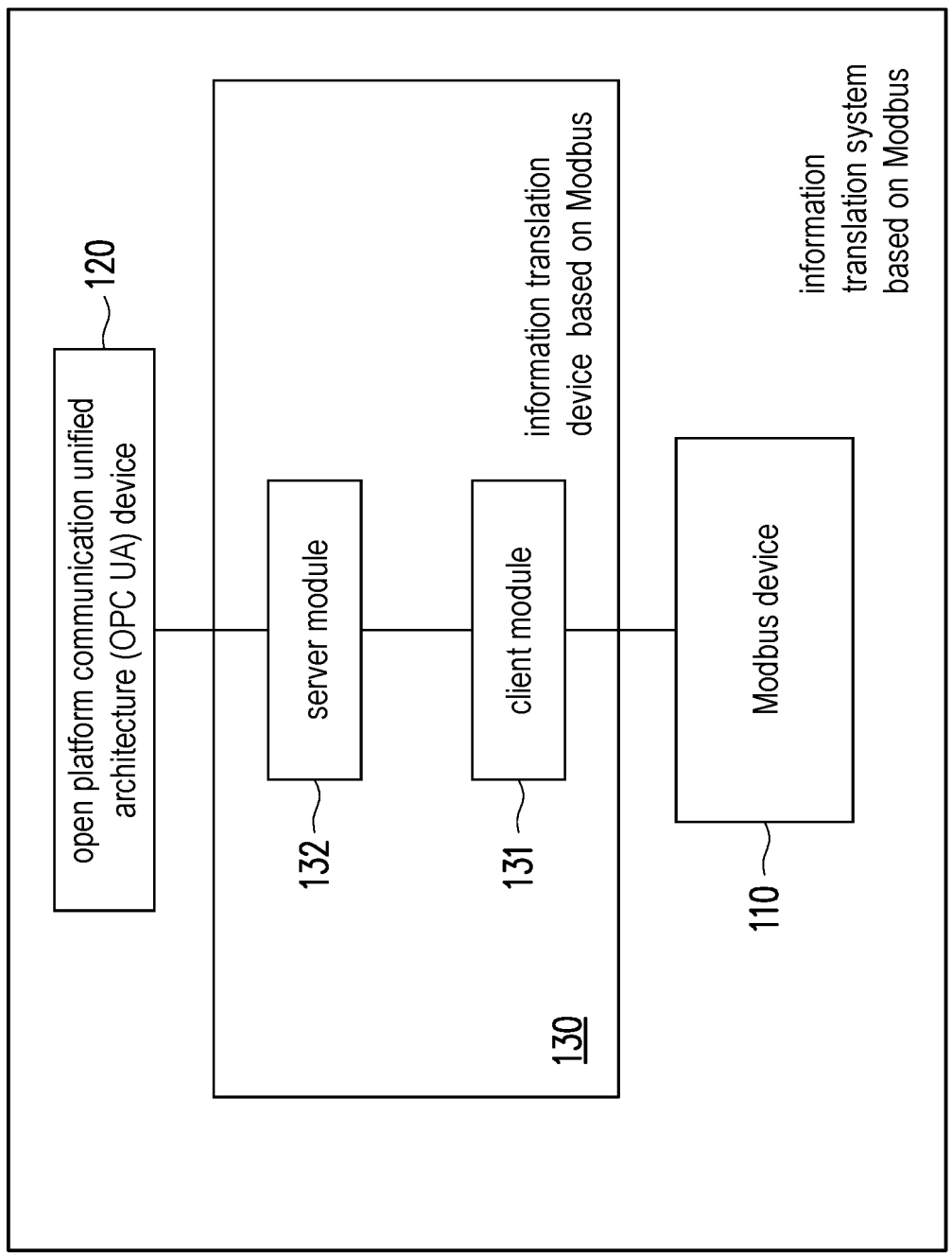
FIG. 1 is a schematic view illustrating an information translation system based on Modbus according to an embodiment of the disclosure.

FIG. 1 is a schematic view illustrating an information translation system 100 based on Modbus according to an embodiment of the disclosure. Referring to FIG. 1, the information translation system 100 based on Modbus includes a Modbus device 110, an open platform communication unified architecture (OPC UA) device 120, and an information translation device 130 based on Modbus.

The Modbus device 110 is a device that supports the Modbus protocol. In an embodiment, the Modbus device 110 includes a sensor, such as a temperature sensor, a pressure sensor, or various other types of sensors. In another embodiment, the sensor may also be disposed outside the Modbus device 110 instead of being disposed inside the Modbus device 110. The disclosure does not limit the implementation of the sensor.

The OPC UA device 120 is a device that supports the open platform communication unified architecture communication (OPC UA) protocol, such as an Industrial Internet-of-Things (IoT) device.

The information translation device 130 based on Modbus includes a client module 131 and a server module 132. The server module 132 is coupled to the client module 131.

In an embodiment, the client module 131 and the server module 132 may be software and/or firmware code executed by the processor. In another embodiment, the client module 131 and the server module 132 may be implemented as a client circuit and a servo circuit. In another embodiment, the client module 131 and the server module 132 may be implemented as a combination of software and/or firmware code and circuits. The disclosure does not limit the implementation method of the client module 131 and the server module 132.

In the disclosure, the information translation device 130 based on Modbus receives a Modbus data through the Modbus protocol and transmits the translated Modbus data to an OPC UA device 120 through an OPC UA protocol. Specifically, the client module 131 receives the Modbus data through the Modbus protocol and performs translation, and the server module 132 transmits the translated Modbus data to the OPC UA device 120 through the OPC UA protocol.

In the embodiment, the information translation device provides a man-machine interface for the user to set the type of the Modbus data that the user wants to receive (and translate) from the Modbus device 110. The information translation device 130 generates an information model file corresponding to the type of the Modbus data.

The client module 131 receives the information model file. For example, the information model file may be in an extensible markup language (XML) format. The information model file may include identity information. Specifically, the identity information may include an identity name and an identity code corresponding to the identity name. The identity name may be the type of the Modbus data that the user wants to receive from the server module 132, and the identity code may be used as an identify code when the values are transmitted between the client module and the server module.

For example, if the type of the Modbus data from the server module 132 the user wants to receive is temperature, the user sets the identity information as "the identity name is temperature, and the corresponding identity code is identity code 1". If the type of the Modbus data the user wants to receive from the server module 132 is pressure, the user sets the identity information as "the identity name is pressure, and the corresponding identity code is identity code 2", etc. "Identity code 1" and "identity code 2" are used as identity codes when the values are transmitted between the client module 131 and the server module 132.

The client module 131 receives the Modbus data. Table 1 illustrates an example of the Modbus data. The Modbus data includes multiple memory addresses of the Modbus protocol (i.e., the memory addresses 0x0000, 0x0001, 0xF000, and 0xF800 in Table 1), and the values corresponding to each of the memory addresses at different time points. For example, the value of the Modbus data corresponding to the memory address 0x0000 at time t1 is 100 and at time t2 the value is 100. The value of the Modbus data corresponding to the memory address 0x0001 at time t1 is 0 and at time t2 the value is 1. The value of the Modbus data corresponding to the memory address 0xF000 at time t1 is 20 and at time t2 the value is 30. The value of the Modbus data corresponding to the memory address 0xF800 at time t1 is 0 and at time t2 the value is 100. In an embodiment, the time t1 and the time t2 may be set at a predetermined time interval (e.g., 30 seconds).

TABLE 1 an example of the Modbus data

| memory address | the value of the Modbus data at time t1 | the value of the Modbus data at time t2 |
|---|---|---|
| 0x0000 | 100 | 100 |
| 0x0001 | 0 | 1 |
| ... | ... | ... |
| 0xF000 | 20 | 30 |
| 0xF800 | 0 | 100 |
| ... | ... | ... |

In the embodiment, the sensor signal may include a temperature sensor signal and a pressure sensor signal.

Assuming that the identity information (also referred to the first identity information) set by the user is "the identity name is temperature, and the corresponding identity code is identity code 1" (i.e., the type of the Modbus data the user wants to receive from the server module 132 is temperature), in order to determine which Modbus data of the memory address represents "temperature" from the Modbus data shown in Table 1, the client module 131 receives a sensor signal corresponding to the first identity information, that is, a temperature sensor signal sensed by a temperature sensor.

On the other hand, assuming that the first identity information set by the user is "the identity name is pressure, and the corresponding identity code is identity code 2" (i.e., the type of the Modbus data the user wants to receive from the server module 132 is pressure), in order to determine which Modbus data of the memory address represents "pressure" from the Modbus data shown in Table 1, the client module 131 receives a sensor signal corresponding to the first identity information, that is, a pressure sensor signal sensed by a pressure sensor.

Table 2 illustrates an example of sensor signals. Assuming that the first identity information set by the user is "the identity name is temperature, and the corresponding identity code is identity code 1", Table 2 shows that the value of the sensed temperature of the temperature sensor at time t1 is 20 degrees and the value of the sensed temperature at time t2 is 30 degrees. In an embodiment, the time t1 and the time t2 may be set at a predetermined time interval (e.g., 30 seconds).

TABLE 2 an example of sensor signals
value of the sensed temperature

| time t1 | time t2 |
|---|---|
| 20 degrees (20° C.) | 30 degrees (30° C.) |

Multiple sensed values (e.g., shown in Table 2) and multiple values (e.g., shown in Table 1) at a predetermined time interval correspond to one another in a one-to-one manner at the predetermined time interval. That is, the value of the sensed temperature (20° C.) at time t1 in Table 2 corresponds to the value 100 of memory address 0x0000 at time t1, the value 0 of memory address 0x0001 at time t1, the value 20 of memory address 0xF000 at time t1, and the value 0 of memory address 0xF800 at time t1 respectively in Table 1. The value of the sensed temperature (30° C.) at time t2 in Table 2 corresponds to the value 100 of memory address 0x0000 at time t2, the value 1 of memory address 0x0001 at time t2, the value 30 of memory address 0xF000 at time t2, and the value 100 of the memory address 0xF800 at time t2 respectively in Table 1.

The client module 131 determines the first memory address corresponding to the sensor signal according to multiple sensed values (e.g., Table 2) and multiple values (e.g., Table 1) at a predetermined time interval. For example, among the memory addresses 0x0000, 0x0001, 0xF000, and 0xF800 shown in Table 1, the client module 131 determines which memory address (also referred to the first memory address) the temperature sensor signal corresponds to.

In one embodiment, the client module 131 performs root-mean-square calculations (e.g. by the formula 1) on multiple sensed values (e.g. Table 2) and multiple values (e.g. Table 1) corresponding to each of the memory addresses to obtain which first memory address of the memory addresses shown in Table 1 the temperature sensor signal corresponds to.

$$\text{root} - \text{mean} - \text{square calculation} = \frac{1}{N}\sum_{t=1}^{N}(f_t - y_t)^2 \quad \text{(Formula 1)}$$

Where $f_t$ is the multiple sensed values of the sensor signal, and $y_t$ is the multiple values of the Modbus data The client Module 131 performs root-mean-square calculations on the value of the sensed temperature at time t1 and time t2 in Table 2 and the value of memory address 0x0000 at time t1 and t2 in Table 1 to obtain the root mean square error between the value of the sensed temperature and the value of the memory address 0x0000, performs root-mean-square calculations on the value of the sensed temperature at time t1 and time t2 in Table 2 and the value of memory address 0x0001 at time t1 and t2 in Table 1 to obtain the root mean square error between the value of the sensed temperature and the value of the memory address 0x0001, performs root-mean-square calculations on the value of the sensed temperature at time t1 and time t2 in Table 2 and the value of memory address 0xF000 at time t1 and time t2 in Table 1 to obtain the root mean square error between the value of the sensed temperature and the value of the memory address 0xF000, and performs root-mean-square calculations on the value of the sensed temperature at time t1 and time t2 in Table 2 and the value of memory address 0xF800 at time t1 and t2 in Table 1 to obtain the root mean square error between the value of the sensed temperature and the value of the memory address 0xF800.

Since the root mean square error between the value of the sensed temperature and the value of memory address 0xF000 is less than the error between the multiple values and the multiple value of the sensed temperatures of other memory addresses (memory address 0x0000, memory address 0x0001, and memory address 0xF800), accordingly the client module 131 determines that the first memory address is the memory address 0xF000, that is, the value of the memory address 0xF000 is "temperature" which is the type of the Modbus data the user wants to receive from the server module 132.

The disclosure does not limit the manner in which the client module 131 obtains the first memory address from the multiple sensed values and the multiple values corresponding to each of the memory addresses. For example, the client module 131 may obtain the first memory address from the multiple sensed values and the multiple values corresponding to each of the memory addresses through a manner such as Euclidean distance, edit distance on real sequence (EDR), the longest common sub sequence (LCSS), dynamic time warping (DTW), Frechet distance, Hausdorff distance, one way distance, locality in between polylines (LIP distance), etc.

The client module 131 builds a memory address mapping table including the first memory address and the first identity information. Table 3 illustrates an example of a memory address mapping table assuming that the client module 131 determines that the first memory address corresponding to the temperature sensor signal is 0xF000, and the first memory address corresponding to the pressure sensor signal is 0x0001.

TABLE 3 an example of a memory address mapping table

| the first memory address | the first identity information | |
|---|---|---|
| 0xF000 | identity name: temperature | identity code: identity code 1 |
| 0x0001 | identity name: pressure | identity code: identity code 2 |

The client module 131 receives the first value of the first memory address. For example, when the Modbus data (as shown in Table 1) is received by the client module 131, with the memory address mapping table shown in Table 3, the client module 131 recognizes that the first memory address 0xF000 is the value of the temperature sensor signal and receives the first value of the first memory address 0xF000 (i.e., continuously receives the values of the temperature sensor signal of the first memory address 0xF000 at time t1, time t2, and subsequent time points). On the other hand, with the memory address mapping table shown in Table 3, the client module 131 recognizes that the first memory address 0x0001 is the value of the pressure sensor signal and receives the first value of the first memory address 0x0001 (i.e., continuously receives the values of the pressure sensor signal value of the first memory address 0x0001 at time t1, time t2, and subsequent time points).

The client module 131 searches the first identity information (i.e., "identity name: temperature, identity code: identity code 1") corresponding to the first memory address 0xF000 according to the memory address mapping table shown in Table 3. On the other hand, the client module 131 searches the first identity information (i.e., "identity name: pressure, identity code: identity code 2") corresponding to the first memory address 0x0001 according to the memory address mapping table shown in Table 3.

The server module 132 receives the first value (continuously receives the values of the temperature sensor signal of the first memory address 0xF000 at time t1, time t2, and subsequent time points) and the first identity information ("identity name: temperature, identity code: identity code 1") and transmits the first value and the first identity information to the OPC UA 120. On the other hand, the server module 132 receives the first value (continuously receives the values of the pressure sensor signal of the first memory address 0x0001 at time t1, time t2, and subsequent time points) and the first identity information ("identity name: pressure, identity code: identity code 2") and transmits the first value and the first identity information to the OPC UA120.

Figure 2:
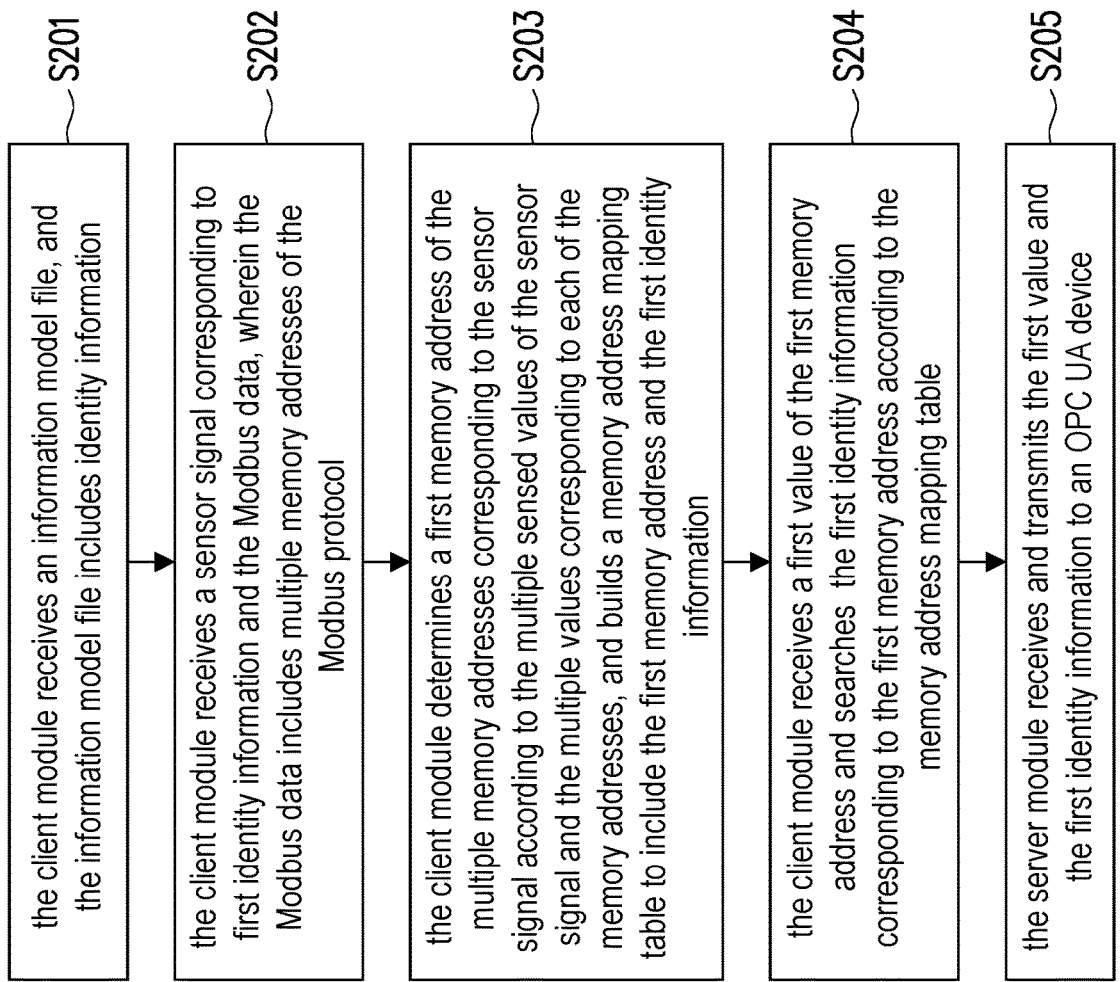
FIG. 2 is a flowchart illustrating an information translation method based on Modbus according to an embodiment of the disclosure.

FIG. 2 is a flowchart illustrating an information translation method 200 based on Modbus according to an embodiment of the disclosure.

In step S201, the client module receives an information model file, and the information model file includes identity information.

In step S202, the client module receives a sensor signal corresponding to first identity information and the Modbus data, wherein the Modbus data includes multiple memory addresses of the Modbus protocol.

In step S203, the client module determines a first memory address of the multiple memory addresses corresponding to the sensor signal according to the multiple sensed values of the sensor signal and the multiple values corresponding to each of the memory addresses, and builds a memory address mapping table to include the first memory address and the first identity information.

In step S204, the client module receives a first value of the first memory address and searches the first identity information corresponding to the first memory address according to the memory address mapping table.

In step S205, the server module receives and transmits the first value and the first identity information to an OPC UA device.

Based on the above, the information translation device, the information translation method, and the information translation system based on Modbus in the disclosure are capable of receiving a sensor signal corresponding to the first identity information and determining the first memory address of the sensor signal corresponding to the Modbus data. Accordingly, the first identity information and the value of the first memory address are transmitted to the open platform communication unified architecture device.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions

What is claimed is:

1. An information translation device, adapted to receive a data through a protocol and transmit the translated data to an Industrial Internet-of-Things (IoT) device, wherein the information translation device comprises:
   a client module, configured to:
   receive an information model file, wherein the information model file comprises identity information;
   receive a sensor signal corresponding to first identity information and the data, wherein the data comprises a plurality of memory addresses and values corresponding to each of the memory addresses at a plurality of time points;
   perform a root-mean-square calculation according to two sensed values of the sensor signal and two values corresponding to each of the memory addresses at two time points of the plurality of time points to obtain root mean error between the two sensed values and the two value of the memory address; and
   determine a first memory address of the plurality of memory addresses corresponding to the sensor signal, and builds a memory address mapping table, wherein the memory address mapping table comprises a mapping between the first memory address and the first identity information; and
   a server module coupled to the client module;
   wherein the client module is further configured to receive a first value of the first memory address and searches the first identity information corresponding to the first memory address according to the memory address mapping table, wherein the first identity information comprises a first identity name and a first identity code corresponding to the first identity name; and wherein the server module is configured to receive the first value and the first identity code and transmits the first value and the first identity information corresponding to the first identify code to the Industrial IoT device;

wherein the root-mean-square calculation is as follows:

$$\frac{1}{N}\sum_{t=1}^{N}(f_t - y_t)^2$$

where $f_t$ is the plurality of sensed values of the sensor signal, and $y_t$ is the plurality of values corresponding to each of the memory addresses at the predetermined time interval.

2. The information translation device according to claim 1, wherein an error between the plurality of values of the first memory address and the plurality of sensed values is less than an error between the plurality of values of other memory addresses and the plurality of sensed values.

3. The information translation device according to claim 1, wherein the identity information comprises an identity name and an identity code corresponding to the identity name.

4. The information translation device according to claim 1, wherein the sensor signal comprises a temperature sensor signal and a pressure sensor signal.

5. An information translation method adapted to receive a data a protocol and transmit the translated data to an Industrial Internet-of-Things (IoT) device, wherein the information translation method comprises:
  building a memory address mapping table, comprising:
    receiving an information model file by a client module, wherein the information model file comprises identity information;
    receiving a sensor signal corresponding to first identity information and the data by the client module, wherein the data comprises a plurality of memory addresses and values corresponding to each of the memory addresses at a plurality of time points;
    performing a root-mean-square calculation according to two sensed values of the sensor signal and two values corresponding to each of the memory addresses at two time points of the plurality of time points to obtain root mean error between the two sensed values and the two value of the memory address; and
  determining a first memory address of the plurality of memory addresses corresponding to the sensor signal by the client module;
  wherein the memory address mapping table comprises a mapping between the first memory address and the first identity information;
  receiving a first value of the first memory address and searching the first identity information corresponding to the first memory address according to the memory address mapping table by the client module, wherein the first identity information comprises a first identity name and a first identity code corresponding to the first identity name; and
  receiving the first value and the first identity code and transmitting the first value and the first identity information corresponding to the first identify code to the Industrial IoT device by a server module;

wherein the root-mean-square calculation is as follows:

$$\frac{1}{N}\sum_{t=1}^{N}(f_t - y_t)^2$$

where $f_t$ is the plurality of sensed values of the sensor signal, and $y_t$ is the plurality of values corresponding to each of the memory addresses at the predetermined time interval.

6. The information translation method according to claim 5, wherein an error between the plurality of values of the first memory address and the plurality of sensed values is less than an error between the plurality of values of other memory addresses and the plurality of sensed values.

7. The information translation method according to claim 5, wherein the identity information comprises an identity name and an identity code corresponding to the identity name.

8. The information translation method-according to claim 5, wherein the sensor signal comprises a temperature sensor signal and a pressure sensor signal.

9. An information translation system, comprising:
  a device supporting a protocol;
  an Industrial Internet-of-Things (IoT) device; and
  an information translation device receiving a data through the protocol by the device and transmitting the translated data to an Industrial Internet-of-Things (IoT) device, wherein the information translation device comprises:
  a client module, configured to:
  receives receive an information model file, wherein the information model file comprises identity information;
  receive a sensor signal corresponding to first identity information and the data, wherein the data comprises a plurality of memory addresses and values corresponding to each of the memory addresses at a plurality of time points;
  perform a root-mean-square calculation according to a two sensed values of the sensor signal and two values corresponding to each of the memory addresses two time points of the plurality of time points to obtain root mean error between the two sensed values and the two value of the memory address;
  determine a first memory address of the plurality of memory addresses corresponding to the sensor signal, and builds a memory address mapping table, wherein the memory address mapping table comprises a mapping between the first memory address and the first identity information; and
  a server module coupled to the client module;
  wherein the client module is further configured to receive a first value of the first memory address and searches the first identity information corresponding to the first memory address according to the memory address mapping table, wherein the first identity information comprises a first identity name and a first identity code corresponding to the first identity name; and
  wherein the server module is configured to receive the first value and the first identity code and transmits the first value and the first identity information corresponding to the first identify code to the Industrial IoT device;

wherein the root-mean-square calculation is as follows:

$$\frac{1}{N}\sum_{t=1}^{N}(f_t - y_t)^2$$

where $f_t$ is the plurality of sensed values of the sensor signal, and $y_t$ is the plurality of values corresponding to each of the memory addresses at the predetermined time interval.

10. The information translation system-according to claim 9, wherein an error between the plurality of values of the first memory address and the plurality of sensed values is less than an error between the plurality of values of other memory addresses and the plurality of sensed values.

11. The information translation system-according to claim 9, wherein the identity information comprises an identity name and an identity code corresponding to the identity name.

12. The information translation system-according to claim 9, wherein the sensor signal comprises a temperature sensor signal and a pressure sensor signal.

13. A non-volatile computer readable recording medium, adapted to receive a data through a protocol and transmit the translated data to an Industrial Internet-of-Things (IoT) device, wherein the non-volatile computer readable recording medium stores a program code, and through a processor the program code performs:
  building a memory address mapping table, comprising:
    receiving an information model file by a client module, wherein the information model file comprises identity information;
    receiving a sensor signal corresponding to first identity information and the data by the client module, wherein the data comprises a plurality of memory addresses and values corresponding to each of the memory addresses at a plurality of time points;
    performing a root-mean-square calculation according to two sensed values of the sensor signal and two values corresponding to each of the memory addresses at two time points of the plurality of time points to obtain root mean error between the two sensed values and the two value of the memory address; and
    determining a first memory address of the plurality of memory addresses corresponding to the sensor signal by the client module;
  wherein the memory address mapping table comprises a mapping between the first memory address and the first identity information;
  receiving a first value of the first memory address by the client module and searching the first identity information corresponding to the first memory address according to the memory address mapping table, wherein the first identity information comprises a first identity name and a first identity code corresponding to the first identity name; and
  receiving the first value and the first identity code and transmitting the first value and the first identity information corresponding to the first identify code to the Industrial IoT device by a server module;
wherein the root-mean-square calculation is as follows:

$$\frac{1}{N}\sum_{t=1}^{N}(f_t - y_t)^2$$

where $f_t$ is the plurality of sensed values of the sensor signal, and $y_t$ is the plurality of values corresponding to each of the memory addresses at the predetermined time interval.

* * * * *